(12) United States Patent
Lamprecht et al.

(10) Patent No.: US 6,848,985 B2
(45) Date of Patent: Feb. 1, 2005

(54) HAND TOOL COMPRISING A DUST SUCTION DEVICE

(75) Inventors: Justus Lamprecht, Dusslingen (DE); Joachim Hecht, Magstadt (DE); Stephan Jonas, Evanston, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/398,430

(22) PCT Filed: Oct. 17, 2001

(86) PCT No.: PCT/DE01/03968

§ 371 (c)(1), (2), (4) Date: Apr. 4, 2003

(87) PCT Pub. No.: WO02/34462

PCT Pub. Date: May 2, 2002

(65) Prior Publication Data

US 2004/0020671 A1 Feb. 5, 2004

(30) Foreign Application Priority Data

Oct. 28, 2000 (DE) .......................................... 100 53 682

(51) Int. Cl.⁷ .............................................. B24B 55/04
(52) U.S. Cl. ........................ 451/453; 451/456; 451/449
(58) Field of Search ................................ 451/453, 456, 451/449, 488; 173/217, 75; 144/252.1

(56) References Cited

U.S. PATENT DOCUMENTS

| 3,850,254 | A | * | 11/1974 | Hirdes ........................ 173/75 |
| 5,113,951 | A | * | 5/1992 | Houben et al. ................ 173/75 |
| 5,129,467 | A | * | 7/1992 | Watanabe et al. ............. 173/75 |
| 5,467,835 | A | * | 11/1995 | Obermeier et al. ......... 175/209 |

FOREIGN PATENT DOCUMENTS

| DE | 196 53 330 A1 | * | 6/1998 |
| EP | 0 470 046 A | * | 2/1992 |
| EP | 0 579 964 A | * | 1/1994 |
| GB | 2 247 852 A | * | 3/1992 |

* cited by examiner

Primary Examiner—Dung Van Nguyen
(74) Attorney, Agent, or Firm—Michael J. Striker

(57) ABSTRACT

The dust removal device comprises a fan (18), a dust collection receptacle (24), and a suction passage (28). The dust collection receptacle (24) equipped with a dust filter (26) is located in the path of air flow (34, 36) between the suction passage (28) and the fan (18). The dust is therefore filtered out of the air stream before it reaches the fan, which prevents dust-induced wear. It is also possible to use the same fan for engine cooling as well as dust removal.

3 Claims, 2 Drawing Sheets

US 6,848,985 B2

HAND TOOL COMPRISING A DUST SUCTION DEVICE

BACKGROUND OF THE INVENTION

The present invention concerns a hand power tool with a dust removal device, comprising a fan driven by the motor of the hand power tool, a dust collection receptacle, and a suction passage, whereby a path of air flow exists between the fan, the suction passage, and the dust collection receptacle such that air is drawn through the suction passage by the fan and is conveyed into the suctioned dust collection receptacle, whereby the dust collection receptacle equipped with the dust filter is located in the oath of air flow between the suction passage and the fan.

A hand power tool with a dust removal device of this type was made known in DE 196 53 330 A1. With this arrangement of the dust collection receptacle between the suction passage and the fan-unlike the dust removal device made known, e.g., in DE 196 53 330 A1—the air filled with dust particles is not directed through the fan, because the fan can be damaged by the dust, which comes in at a relatively high rate of speed. With the dust removal device made known in EP 579 964 A1, the fan serves simultaneously as fan to cool the motor of the hand power tool. Since it is not unlikely that the dust filter will become clogged, there is a danger that this could result in an inadequate amount of cooling air being directed past the motor.

The invention is based on the object of providing a hand power tool with a dust removal device of the type stated initially that can be realized with the least amount of technical effort possible, that is as wear-resistant as possible, and that always supplies the motor of the hand power tool with an adequate amount of cooling air.

SUMMARY OF THE INVENTION

The stated object is attained by providing an air passage for the fan that supplies air to the fan when the fan produces an increased vacuum caused by the dust filter becoming clogged. Even when the dust filter is clogged, the fan can then still draw enough air via an additional air passage to cool the motor.

The path of air flow provided to cool the motor can be produced not only by directing the air drawn through the dust collection across the motor before it reaches the fan, but also by the fact that the fan blows the air drawn in through the suction passage and the dust collection receptacle past the motor.

BRIEF DESCRIPTION OF THE DRAWINGS

The invention will be described hereinbelow with reference to the exemplary embodiments presented in the drawings.

DESCRIPTION OF THE PREFERRED EMBODIMENTS

Figure 1:
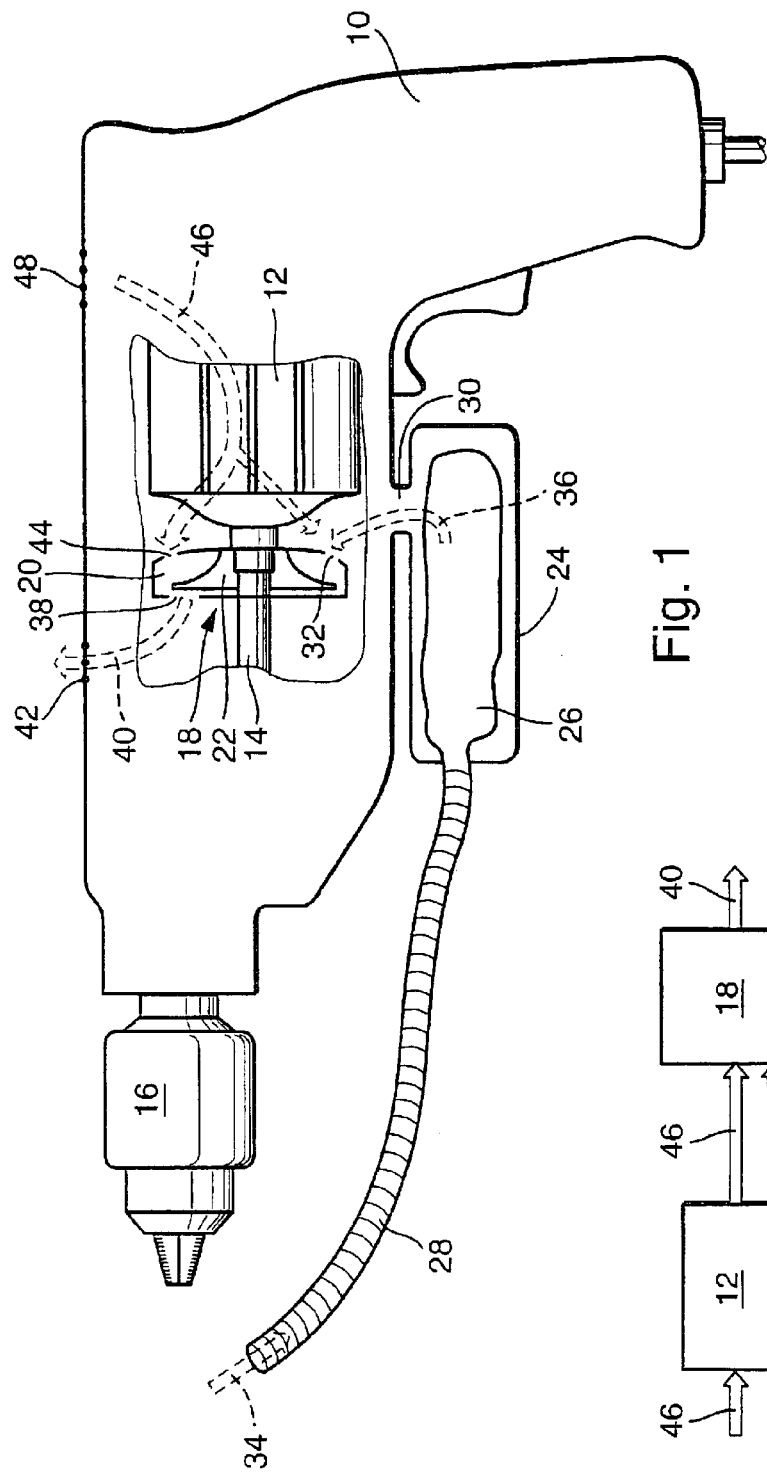
FIG. 1 is a partial sectional view of a hand power tool with a first variant of a path of air flow that cools the motor.

FIG. 1 is a partial sectional view of a hand power tool 10, e.g., a drilling hammer. The invention described hereinbelow concerns any type of hand power tool, however, that has a rotating drive and with which dust is produced when an object is machined.

As one can see through the cut-out in FIG. 1, a motor 12 is located in the hand power tool 10 that has a drive shaft 14 for a tool (not shown) mounted in a tool holder 16 of the hand power tool 10. A fan 18 is mounted on the drive shaft 14 that comprises a fan chamber 20 and a ventilator 22 that is located therein and is coupled with the drive shaft 14.

A dust collection receptacle 24 with a dust bag 26 functioning as dust filter is located on the outside of the power tool 10. A suction passage 28 empties into the dust collection receptacle 24 and/or into the dust bag 26, which said suction passage extends into the vicinity of the tool mounted in the hand power tool 10 where dust is produced while the hand power tool 10 is operated. An air-conducting connection is produced between the dust collection receptacle 24 and the ventilator 22 of the fan 18 via a common opening 30 in the dust collection receptacle 24 and in the housing of the hand power tool 10, and via an opening 32 in the fan chamber 20 of the fan 18. A path of air flow is therefore produced to the fan chamber 20 via the suction passage 28 and the dust collection receptacle 24 equipped with a filter 26.

If the ventilator 22 is now started rotating when the hand power tool 10 is operated and a vacuum is therefore produced in the fan chamber 20, the air filled with dust and generated at the site of the tool is drawn in through the suction passage 28 and into the dust collection receptacle 24, as indicated by the dashed arrow 34. The air flow passes through the dust bag 26, by way of which it is separated from the dust particles, and finally reaches the fan chamber 20, as indicated by the dashed arrow 36. The suctioned air is blown out of the fan chamber 20 through an opening 38 in another side of the fan chamber 20—as indicated by the dashed arrow 40—and reaches the outside through one or more air slits 42 in the housing of the hand power tool 10.

In addition, an air stream directed past the motor 12—as indicated by the dashed arrow 46—is drawn in through one or more openings 32, 44 in the fan chamber 20, which said openings face the motor 12. This air stream 46 is drawn in from the outside through one or more air slits 48 in the housing wall of the hand power tool 10. The air slit or air slits 48 is/are positioned relative to the motor 12 in such a fashion that a path for air flow past the motor 12 results that ensures optimum cooling of the motor 12. The air drawn in past the motor 12 is also blown out of the fan chamber 20 to the outside via one or more openings 38 in the opposite side of the fan chamber 20 through the air slit(s) 42 in the housing wall of the hand power tool 10. The fan 18 therefore performs two functions simultaneously, i.e., dust removal and motor cooling.

The ventilator 22 in the fan chamber 20 can be installed directly on the drive shaft 14 of the motor 12, or it can be coupled with the drive shaft via a gearset having a high gear ratio. The ventilator 22 could therefore be operated at a high rotational speed in order to obtain the greatest suction power possible. The suction power can also be increased by situating a plurality of ventilators in tandem.

In deviation from the exemplary embodiment presented in FIG. 1, in the case of which the dust collection receptacle 24 is located outside the hand power tool 10, this dust collection receptacle can also be integrated inside the hand power tool 10.

Passages having an appropriate structural design can be provided inside the hand power tool to obtain a more targeted conductance of the air flows 36, 40, 46 and, therefore, a more effective intake and/or discharge of air.

Figure 2:
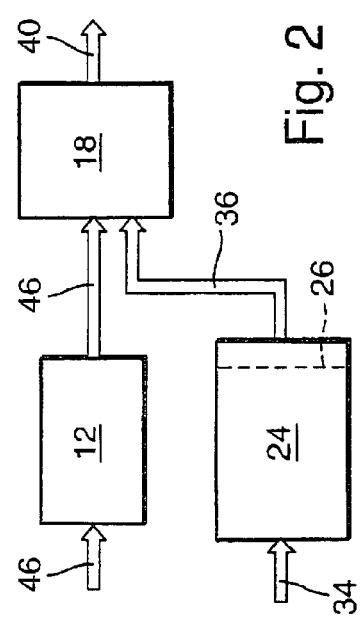
FIG. 2 is a schematic representation of the mode of action of dust removal and motor cooling according to the variant according to FIG. 1.

The schematic representation shown in FIG. 2 is provided to illustrate the individual paths of air flow that occur in the hand power tool 10 according to FIG. 1. The individual blocks 12, 18, 24 represent the motor 12, the fan 18, and the dust collection receptacle 24 with the dust bag 26 located therein and serving as filter. The air flows 34, 36, 42, 46 drawn in FIG. 1 have the same reference numerals in FIG. 2. FIG. 2 shows clearly that two paths of air flow 36 and 46 enter the fan 18, whereby the one path of air flow 36 travels through the dust collection receptacle 24, and the other path of air flow 46 travels past the motor 12.

Figure 3:
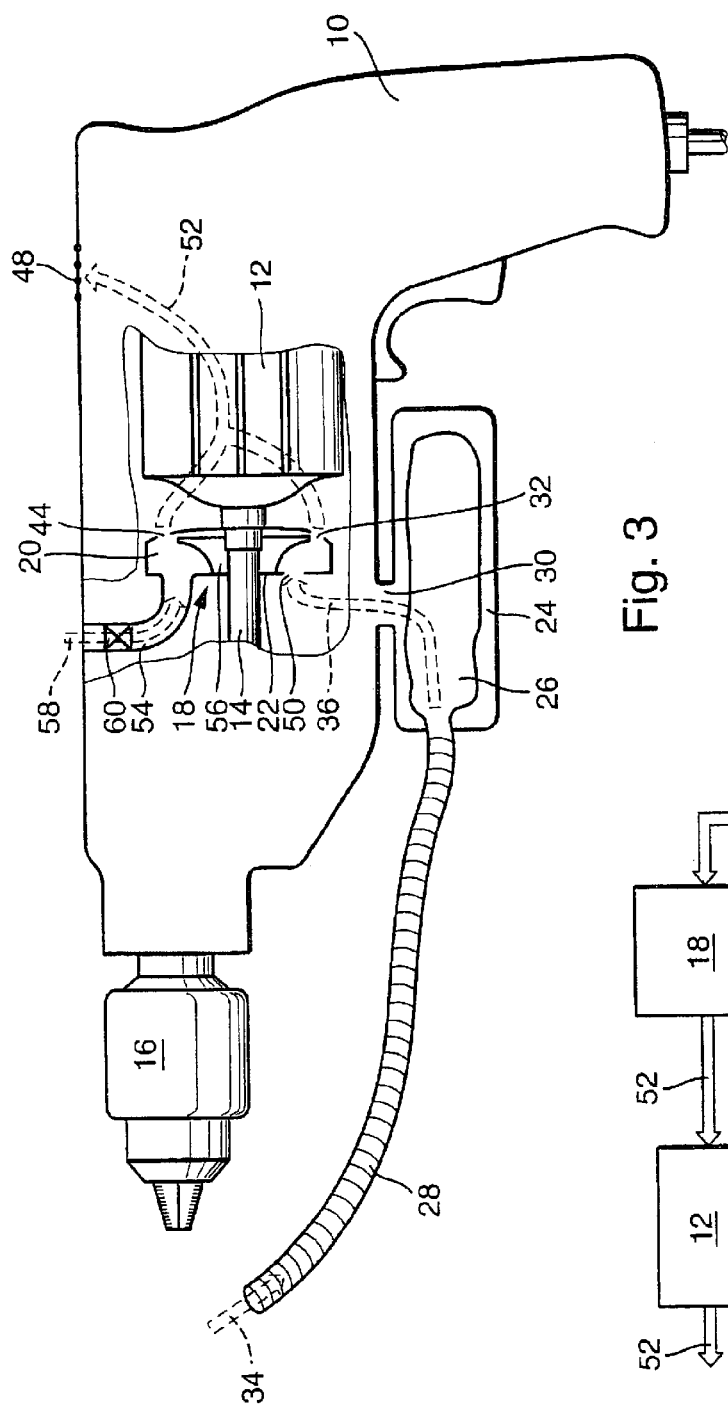
FIG. 3 is a partial sectional view of a hand power tool with a second variant of a path of air flow to cool the motor.
Figure 4:
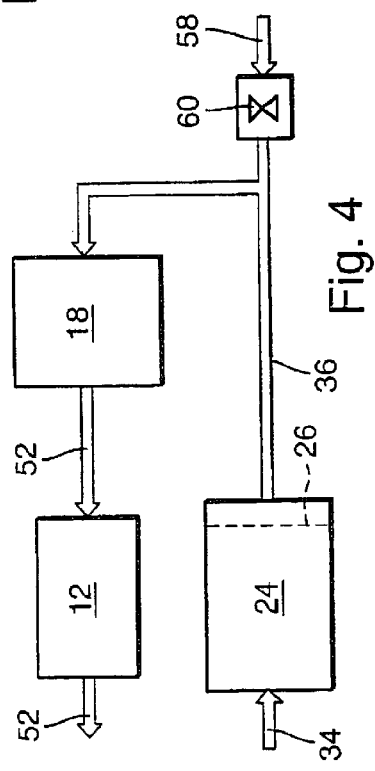
FIG. 4 is a schematic representation of the mode of action of dust removal and engine cooling according to the variant depicted in FIG. 1.

FIGS. 3 and 4 show a further exemplary embodiment of a dust removal device that performs motor cooling simultaneously with and in addition to dust removal. The elements in FIGS. 3 and 4 that have the same significance and mode of action as elements in FIGS. 1 and 2 have been labelled with the same reference numerals as in FIGS. 1 and 2. Elements that are found in FIGS. 1 and 2 and that were already described hereinabove will not be described once more with regard for FIGS. 3 and 4. The exemplary embodiment presented in FIGS. 3 and 4 basically differs from the exemplary embodiment in FIGS. 1 and 2 in terms of a different path of air flow for cooling the motor 12.

The air flow that was drawn in via the suction passage 28 and cleaned of dust by the dust bag 26 acting as filter travels through one or more openings 50 and reaches the fan chamber 20. The air is blown out of the fan chamber 20 through one or more openings 32, 44 in such a manner, in fact, that this discharged air is directed past the motor 12 and travels through one or more air slits 48 in the housing wall of the hand power tool 10 to reach the outside. This air stream, which leaves the fan chamber 20 and serves to cool the motor 12, is indicated in FIG. 3 by a dashed arrow 52. In order to convert the suctioned air flow 36 into the cooling air flow 52, the opening 50 is located on the side of the fan chamber 20 opposite the motor 12 and the openings 32, 44.

The dust bag 26 can become so full of dust that the air flow 36 drawn in by the fan 18 is not sufficient to form a cooling air flow 52 that is great enough for the motor 12. An additional air passage 54 is provided for this case, which said additional air passage empties into the fan chamber 20 via an opening 56. This opening 56 for the air passage 54 is located on the same side as the opening 50 for the air flow 36 from the dust collection receptacle 24. The air passage 54 leads out of the housing of the hand power tool 10 and forms an access for an air flow 58, shown as a dashed arrow, from outside of the hand power tool 10 into the fan chamber 20. The air flow 58 into the fan chamber 20 should not be opened, however, until the other air flow 36 out of the dust collection receptacle 24 has become too weak, which is expressed as an increase in the vacuum in the fan chamber 20. A valve 60 is therefore provided in the air passage 54 that does not open and allow air 58 to be drawn in until an increased vacuum occurs in the fan chamber 20. In this fashion, adequate cooling of the motor 12 is possible even when the dust filter is clogged.

The dual function of the fan 18, i.e., dust removal and motor cooling, can be illustrated once more with reference to the schematic illustration in FIG. 4. The same reference numerals are used in FIG. 4 as for the corresponding elements and air flows shown in FIG. 3. FIG. 4 illustrates that the air flow 36—directed through the dust collection receptacle 24 and cleaned of dust—is converted into an air flow 52 to cool the motor 12. The air flow 58 controlled by the valve 60 is also indicated in FIG. 4, which said air flow supplements or replaces the air flow 36 from the dust collection receptacle 24 when a certain vacuum occurs in the fan chamber 20 that is caused by the dust bag 26 becoming clogged.

What is claimed is:

1. A hand power tool with a dust removal device, comprising a motor, a fan driven by said motor and supplying cooling air to said motor, a dust collection receptacle; a suction passage formed so that a path of air flow exists between said fan, said suction passage and said dust collection receptacle such that air is drawn through said suction passage by said fan and the dust particles in a suctioned air stream are conveyed into said dust collection receptacle, said dust collection receptacle being provided with a dust filter located in the path of air flow between said suction passage and said fan; and an air passage for said fan supplying air to said fan when said fan produces an increased vacuum caused by said dust filter becoming clogged.

2. A hand powered tool as defined in claim 1, wherein said fan blows out air drawn in via said suction passage and said dust collection receptacle past said motor via a further path of air flow.

3. A hand powered tool as defined in claim 1; and further comprising a valve located in said air passage and opening when a vacuum is produced in said air passage.

* * * * *